(12) United States Patent
Liu

(10) Patent No.: US 9,274,358 B2
(45) Date of Patent: Mar. 1, 2016

(54) LIQUID CRYSTAL DISPLAY APPARATUS

(71) Applicant: Hung-Ta Liu, Hsinchu County (TW)

(72) Inventor: Hung-Ta Liu, Hsinchu County (TW)

(*) Notice: Subject to any disclaimer, the term of this patent is extended or adjusted under 35 U.S.C. 154(b) by 0 days.

(21) Appl. No.: 14/541,153

(22) Filed: Nov. 14, 2014

(65) Prior Publication Data

US 2015/0070618 A1    Mar. 12, 2015

Related U.S. Application Data

(62) Division of application No. 13/338,250, filed on Dec. 28, 2011, now Pat. No. 8,917,228.

(30) Foreign Application Priority Data

Dec. 31, 2010  (TW) .............................. 99147378 A

(51) Int. Cl.
*G09G 3/36* (2006.01)
*G02F 1/133* (2006.01)
*G02F 1/1343* (2006.01)
*G02F 1/1362* (2006.01)

(52) U.S. Cl.
CPC .......... *G02F 1/13306* (2013.01); *G09G 3/3611* (2013.01); *G09G 3/3648* (2013.01); *G02F 1/134363* (2013.01); *G02F 1/136213* (2013.01); *G02F 2001/134372* (2013.01); *G09G 2320/10* (2013.01); *G09G 2330/021* (2013.01); *G09G 2340/0435* (2013.01); *G09G 2370/04* (2013.01)

(58) Field of Classification Search
USPC ....................................................... 345/99, 92
See application file for complete search history.

(56) References Cited

U.S. PATENT DOCUMENTS

| | | | | |
|---|---|---|---|---|
| 2002/0154253 A1* | 10/2002 | Cairns | ............... | G02F 1/136213 349/43 |
| 2003/0122497 A1* | 7/2003 | Ko | ......... | G09G 3/3233 315/169.3 |
| 2006/0017678 A1* | 1/2006 | Shiomi | ............... | G09G 3/3648 345/89 |
| 2006/0066512 A1* | 3/2006 | Afentakis | ............... | G09G 3/20 345/55 |
| 2008/0055318 A1* | 3/2008 | Glen | ......... | G09G 3/20 345/501 |
| 2008/0100598 A1* | 5/2008 | Juenger | ................... | G09G 5/36 345/204 |
| 2008/0278431 A1* | 11/2008 | Feng | ................... | G09G 3/3696 345/99 |

FOREIGN PATENT DOCUMENTS

| | | |
|---|---|---|
| CN | 1440514 A | 9/2003 |
| CN | 1790470 A | 6/2006 |
| CN | 101763841 A | 6/2010 |
| TW | 200842786 A | 11/2008 |

* cited by examiner

*Primary Examiner* — Roy Rabindranath
(74) *Attorney, Agent, or Firm* — CKC & Partners Co., Ltd.

(57) ABSTRACT

The invention discloses a liquid crystal display apparatus and a pixel element design thereof. The liquid crystal display apparatus includes a register, a liquid crystal display panel, a driving circuit, a dynamic frequency adjustment unit and a control circuit. The liquid crystal display panel includes a plurality of liquid crystal capacitors and a plurality of pixel units. The driving circuit includes a plurality of storage capacitors corresponding to the liquid crystal capacitors. A capacitance of the storage capacitors far exceeds a capacitance of the liquid crystal capacitors. The driving circuit casts the image information on the liquid crystal display panel. The dynamic frequency adjustment unit computes and judges based on an image characteristic classification of the image information, so as to generate a display mode control signal dynamically.

5 Claims, 14 Drawing Sheets

LIQUID CRYSTAL DISPLAY APPARATUS

RELATED APPLICATIONS

This application is a Divisional Application based on U.S. application Ser. No. 13/338,250, filed Dec. 28, 2011, and also claims the benefit of Taiwanese Application Serial Number 099147378, filed Dec. 31, 2010, the disclosures of both of which are hereby incorporated by reference herein in their entirely.

BACKGROUND

1. Field of Invention

The invention relates to a liquid crystal display apparatus. More particularly, the invention relates to a pixel element design and a method for driving the liquid crystal display apparatus.

2. Description of Related Art

In recent years, a liquid crystal display (LCD) apparatus has been applied in many areas, including a notebook personal computer, a monitor, a vehicular navigation device, a functional calculator, various sizes of TV sets, a mobile phone and an electronic message board. Particularly, the current thin and light or portable electronic products have become a new trend in the market. The LCD apparatus has a smaller volume and thickness than the prior CRT (cathode-ray tube) display apparatus, so the LCD apparatus has been widely applied.

In the development of the current electronic display technology, the power consumption of the display apparatus is emphasized, so the LCD apparatus with low power consumption better meets the requirements of a user for energy saving and environment protection. Particularly, in a portable display apparatus (such as a cellular phone, a smart phone, a PDA (personal digital assistant), an e-book and a tablet computer), the power consumption of the LCD module directly influences the endurance of the entire apparatus. Particularly, in the current large-size, thin and light display apparatus, the LCD module with the low power consumption and high efficiency is urgently demanded.

The current LCD apparatus generally has a certain refresh rate or frame rate. Generally, the LCD apparatus adopts the rate of 50-70 Hz. That is, the frame refreshes 50-70 times per second.

In other words, even if the display frame of the LCD apparatus has no change or few changes, the display driving circuit may still periodically refresh a display signal of each pixel of the display module at the rate of 60 times per second. Thus, unnecessary energy consumption is generated.

For a current general TFT-LCD (thin film transistor liquid crystal display) apparatus on the market, the power consumption is mainly caused by the LCD panel, the driving circuit and the backlight module. Taking the 10.1-inch TFT-LCD apparatus as an example, the power consumption of the LCD panel and the driving circuit is approximately between 1000 mW and 2000 mW. On the other hand, the power consumption of the backlight module is approximately between 2000 mW and 3000 mW.

Although a polarity inversion driving method, e.g. a row inversion driving method or a frame inversion driving method, has been proposed in this industry directed for the driving circuit, and an area scanning backlight method has been proposed directed for the backlight module, the above methods have limited effects. Therefore, those in the industry are endeavoring to find an LCD apparatus having a stable display effect and low energy consumption and a display driving method thereof.

SUMMARY

In order to solve the problems above, the invention discloses a liquid crystal display apparatus having a dynamic adjustable refresh rate, and a liquid crystal display apparatus driven by a low refresh rate through the design of a pixel element and a storage capacitor in a (multi) dual-TFT driving circuit and the liquid crystal material thereof. In the liquid crystal display apparatus having the dynamic adjustable refresh rate of the invention, the liquid crystal display apparatus can correspondingly adjust the display refresh rate of the driving circuit based on an image characteristic classification (such as a dynamic state, a static state, images, texts, fast changing and slow changing) of the currently displayed image information, thereby achieving the power saving effect by adopting a low display refresh rate. The dynamic frequency adjustment unit at least has two or more sets of frame rates.

At a low display refresh rate, the potential of a storage capacitor in a general liquid crystal display apparatus gradually changes with time, which causes the transmittance of the liquid crystal display panel changes accordingly. For example, the transmittance under a normally white mode increases with time, and the transmittance under a normally black mode decreases with time, which may lead to an uneven display brightness or luminance in a display frame cycle, thereby further causing phenomena of scintillation and screen flicker. This problem can be solved by, for example, periodically adjusting the drive configuration of a backlight module in a display frame cycle through a liquid crystal display apparatus having brightness or luminance holding ratio compensation.

Accordingly, an aspect of the invention provides a liquid crystal display apparatus, which includes a register, a liquid crystal display panel, a driving circuit, a dynamic frequency adjustment unit and a control circuit. The register is used for temporarily storing image information. The liquid crystal display panel includes a plurality of liquid crystal capacitors. The driving circuit includes a plurality of storage capacitors corresponding to the liquid crystal capacitors. A capacitance of the storage capacitors far exceeds a capacitance of the liquid crystal capacitors. The driving circuit casts the image information on the liquid crystal display panel. The dynamic frequency adjustment unit dynamically generates a display mode control signal based on an image characteristic classification of the image information. The control circuit is electrically connected with the dynamic frequency adjustment unit and the driving circuit. The control circuit accordingly adjusts the display refresh rate and drive parameters of the driving circuit according to the display mode control signal.

According to an embodiment of another aspect of the invention, the driving circuit includes at least two thin film transistor switches corresponding to each pixel unit. An off-state leakage current of the driving circuit is less than or equal to $10^{-12}$ ampere. In this embodiment, the at least two thin film transistor switches form a dual-gate thin film transistor (TFT). In another embodiment, an off-state leakage current of the driving circuit may be further less than or equal to $10^{-13}$ ampere.

According to another embodiment of the invention, the driving circuit includes a lightly doped drain (LDD) TFT. The TFT at least has a first LDD and a second LDD with different lengths. The first LDD nearest to the driving transistor has the largest length, and an off-state leakage current of the driving circuit is less than or equal to $10^{-12}$ ampere. In this embodiment, an off-state leakage current of the driving circuit may be further less than or equal to $10^{-13}$ ampere.

According to yet another embodiment of the invention, the driving circuit adopts a dual-gate TFT driving architecture. An off-state leakage current of the driving circuit is less than $10^{-13}$ ampere.

According to another embodiment of the invention, an average capacitance of the liquid crystal capacitors is larger than or equal to 0.5 picofarad, and the capacitance of the storage capacitors is larger than or equal to ten times of that of the liquid crystal capacitors.

According to still another embodiment of the invention, the capacitance of the storage capacitors is larger than or equal to fifty times of that of the liquid crystal capacitors.

According to still yet another embodiment of the invention, the liquid crystal impedance is larger than or equal to $10^{13}$ ohm/cm, and an alignment-film impedance of the liquid crystal display panel is larger than or equal to ten times of the liquid crystal impedance.

According to an embodiment of the invention, an alignment-film impedance of the liquid crystal display panel is further larger than or equal to fifty times of the liquid crystal impedance.

According to another embodiment of the invention, the liquid crystal display panel includes a plurality of pixel units respectively corresponding to the storage capacitors. The area ratio of the storage capacitors to the pixel units is larger than or equal to 85%.

According to yet another embodiment of the invention, in a method for driving the liquid crystal display panel, row inversion or frame inversion is used for driving the display panel.

According to still another embodiment of the invention, the image characteristic classification at least includes a dynamic image, a static slow image or a static holding image.

According to still yet another embodiment of the invention, the image information further has an image characteristic sub-classification. The image characteristic sub-classification at least includes a full color mode, an image mode, a text mode and/or a monochromatic system. The dynamic frequency adjustment unit generates a corresponding display mode control signal based on the image characteristic classification and the image characteristic sub-classification of the image information.

According to an embodiment of the invention, the dynamic frequency adjustment unit at least has two or more sets of refresh rates.

According to another embodiment of the invention, the display configuration at least includes a gray level.

According to yet another embodiment of the invention, the dynamic frequency adjustment unit at least has a frame rate lower than 20 Hz. In still another embodiment, the dynamic frequency adjustment unit at least has a frame rate lower than 5 Hz.

According to still yet another embodiment of the invention, the liquid crystal display panel includes a plurality of pixel units. Each pixel unit at least corresponds to one of the liquid crystal capacitors and one of the storage capacitors. Each pixel includes a first electrode layer (M1), an extension layer (M2) of a source layer and a drain layer of a second electrode layer, and a pixel electrode layer (M3) of a third electrode layer sequentially disposed on a lower substrate, and a dielectric layer material is respectively disposed therebetween. The first electrode layer includes a gate layer and/or a common electrode conductive layer. The extension layer of the drain layer of the second electrode layer is connected with the pixel electrode layer, and/or the common electrode conductive layer of the first electrode layer is electrically connected with a common transparent electrode layer of the upper substrate. The liquid crystal capacitor is formed between the common transparent electrode layers (ITO, IZO) of the upper substrate and the pixel electrode layer of the lower substrate. On the lower substrate, the storage capacitor is disposed between the common electrode conductive layer of the first electrode layer and the extension layer of the second electrode layer, and/or between the common electrode conductive layer of the first electrode layer and the pixel electrode layer, and/or between the gate layer of the first electrode layer and the pixel electrode layer.

In an embodiment, the pixel electrode layer may be of the pixel electrode layer architecture including Indium Tin Oxide (ITO) slits, and the liquid crystal layer is constructed by negative liquid crystals aligned vertically.

In this embodiment, the pixel electrode layer is a transparent electrode, a metal reflective electrode or a combination thereof. The liquid crystal display panel is a transmissive liquid crystal display panel, a reflective liquid crystal display panel, a transflective liquid crystal display panel or a partially reflective liquid crystal display panel.

According to another embodiment of the invention, the liquid crystal display panel includes a plurality of pixel units. Each pixel unit at least corresponds to one of the liquid crystal capacitors and one of the storage capacitors. Each pixel includes a gate layer (M1) of a first electrode layer, a second electrode layer (M2), and a common electrode layer (M3) of a third electrode layer sequentially disposed on the lower substrate, and a dielectric layer material is respectively disposed therebetween.

The second electrode layer includes a source layer, a drain layer, and a pixel electrode layer connected with the drain layer. The pixel electrode layer of the second electrode layer and the common electrode layer of the third electrode layer are formed in a comb-shaped electrode architecture, a grid-shaped electrode architecture, a curving comb-shaped electrode architecture or a curving grid-shaped electrode architecture. No common electrode layer is disposed on the upper substrate. The liquid crystal capacitor is formed in the curving electric field between the pixel electrode layer of the second electrode layer and the common electrode layer of the third electrode layer. On the lower substrate, the storage capacitor is disposed between the pixel electrode layer of the second electrode layer and the common electrode layer of the third electrode layer.

In another embodiment, the lower substrate of the liquid crystal display apparatus at least includes a pixel electrode layer and a common electrode layer, and an insulation layer is disposed therebetween for isolation. The pixel electrode layer and the common electrode layer may be formed in a comb-shaped electrode architecture, a grid-shaped electrode architecture, a curving comb-shaped electrode architecture or a curving grid-shaped electrode architecture, such as an in plane switching architecture. The liquid crystal molecular layer may be positive or negative liquid crystals aligned horizontally. The pixel electrode layer and the common electrode layer are metal or alloy conductive electrodes.

In yet another embodiment, the liquid crystal display apparatus of the in plane switching architecture at least includes a pixel electrode layer and a common electrode layer. The pixel electrode layer and the common electrode layer may be formed in a comb-shaped electrode architecture, a grid-shaped electrode architecture, a curving comb-shaped electrode architecture or a curving grid-shaped electrode architecture. The common electrode layer is a first metal electrode M1, and the pixel electrode layer is a second metal electrode M2. The storage capacitor formed by the M1 and M2 may be located at the position of the comb-shaped or grid-shaped electrodes, and even a comb-shaped or grid-shaped storage capacitor, or a circumambient or circle (or square-shaped) storage capacitor is formed.

In still another embodiment, the lower substrate of the liquid crystal display apparatus at least includes a pixel electrode layer and a common electrode layer, and an insulation layer is disposed therebetween for isolation. The pixel electrode layer may be of a fringe field switching architecture. The liquid crystal molecular layer may be constructed by negative liquid crystals aligned horizontally. The pixel electrode layer and the common electrode layer are ITO or IZO transparent electrodes, or metal or alloy conductive electrodes. The pixel electrode layer of the fringe field switching architecture may be a rectangle or unit-pixel electrode, a comb-shaped or grid-shaped electrode, or a curving comb-shaped or grid-shaped electrode. The common electrode layer may be a comb-shaped or grid-shaped electrode, or a curving comb-shaped or grid-shaped electrode.

In this embodiment, the dielectric layer material is a silica material SiOx, a nitrogen oxide material SiNx, a resin material, a plastic material or a photoresist material. In this embodiment, on the upper substrate, an interval between the common electrode layer and the drain layer is less than or equal to 0.2 µm.

BRIEF DESCRIPTION OF THE DRAWINGS

In order to make the following as well as other aspects, features, advantages, and embodiments of the invention more apparent, the accompanying drawings are described as follows.

DETAILED DESCRIPTION

Figure 1:
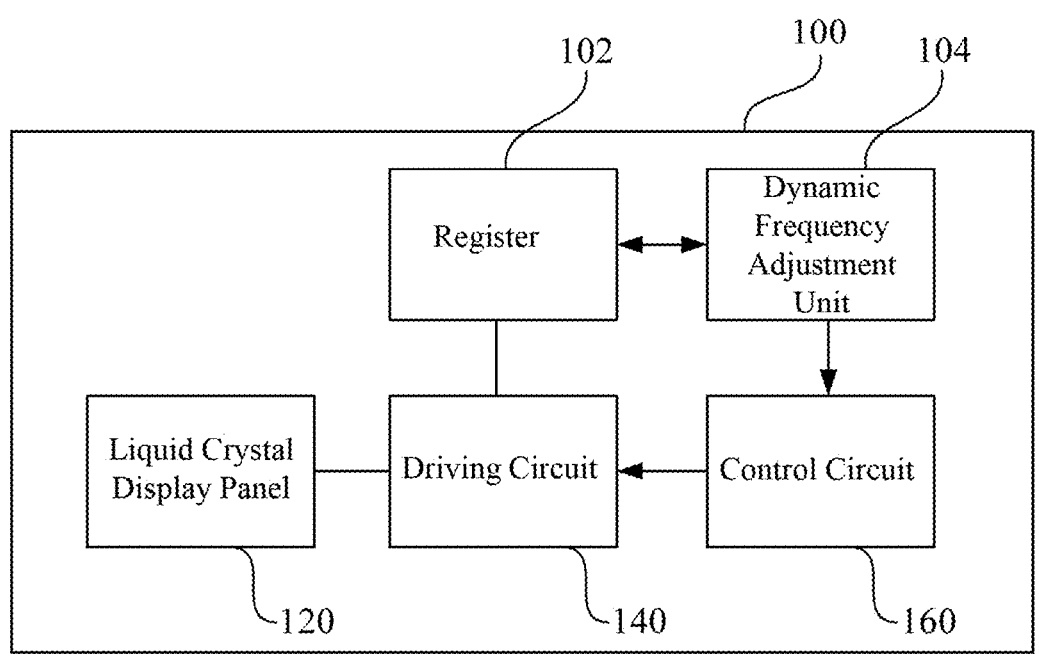
FIG. 1 illustrates a functional block diagram of a liquid crystal display apparatus according to a first specific embodiment of the invention.

Referring to FIG. 1, FIG. 1 illustrates a functional block diagram of a liquid crystal display apparatus 100 according to a first specific embodiment of the invention. As shown in FIG. 1, the liquid crystal display apparatus 100 includes a register 102, a dynamic frequency adjustment unit 104, a liquid crystal display panel 120, a driving circuit 140 and a control circuit 160.

The register 102 is coupled with the driving circuit 140 and the dynamic frequency adjustment unit 104, for temporarily storing image information to be displayed. The driving circuit 140 is used for casting the image information on the liquid crystal display panel 120. The control circuit 160 is electrically connected with the dynamic frequency adjustment unit 104 and the driving circuit 140.

It should be noted that in this embodiment, the driving circuit 140 dynamically adopts different display refresh rates rather than a fixed display refresh rate.

The method of dynamically selecting different display refresh rates is performed by dynamically generating a display mode control signal by the dynamic frequency adjustment unit 104 based on an image characteristic classification of the image information. Subsequently, the control circuit 160 accordingly adjusts the display refresh rate of the driving circuit 140 according to the display mode control signal.

The image characteristic classification of the above-mentioned image information at least includes a dynamic image (such as a movie, an animation and a moving image), a static slow image (such as ecological photography and a page-turning advertisement), or a static holding image (such as an image, a photograph, a static print advertisement, and texts). The dynamic frequency adjustment unit 104 can generates the corresponding display mode control signal based on the image characteristic classification of the image information.

For example, the dynamic image may be maintained at a high display refresh rate (such as 60 Hz); the static slow image may be switched to a medium display refresh rate (such as 20 Hz and 15 Hz); and the static holding image may be switched to a low display refresh rate (such as 5 Hz, 3 Hz and 0.3 Hz), but the invention is not limited to the case. For a strong energy saving requirement, the dynamic image may also be switched to a low display refresh rate.

As described above, in this embodiment, the dynamic frequency adjustment unit 104 of the invention may have two sets (a high display refresh rate and a low display refresh rate), three sets (a high display refresh rate, a medium display refresh rate and a low display refresh rate) or more of frame rates. In an embodiment, the dynamic frequency adjustment unit at least has a frame rate lower than 20 Hz. In another embodiment, the dynamic frequency adjustment unit at least has a frame rate lower than 5 Hz. In yet another embodiment, the dynamic frequency adjustment unit at least has a frame rate further lower than 1 Hz.

Moreover, the image information further has an image characteristic sub-classification. The image characteristic sub-classification at least includes a full color mode, an image mode or a text mode, and/or a monochromatic system. The dynamic frequency adjustment unit 104 can generate a corresponding display mode control signal based on the image characteristic classification (the dynamic image, the static slow image and the static holding image) and the image characteristic sub-classification (the full color mode, the image mode, the text mode and the monochromatic system) of the image information.

For example, the dynamic image, the static slow image and the static holding image may be further divided into a full color mode/monochromatic system and a text/image mode. That is, the dynamic/static slow/static holding image may be further divided into at least four sub-sortings, including a full color image, full color texts, a monochromatic image and monochromatic texts, but the invention is not limited to the case.

Next, the display refresh rate may be adjusted based on different sortings. Furthermore, other display configurations, such as a gray level, may be further adjusted based on the image characteristic classification and the image characteristic sub-classification.

For example, the dynamic image may be switched to the display refresh rate of 10 Hz-60 Hz and the gray level of 256; the static slow image in a full color mode may be further switched to the display refresh rate of 3 Hz-10 Hz and the gray level of 64 or 256; the static slow image in a text mode may be further switched to the display refresh rate of 0.5 Hz-3 Hz and the gray level of 4 or 16; and the static holding image in the text mode and an energy saving mode may be further adjusted to the display refresh rate of 0.05 Hz-0.5 Hz and the gray level of 2 or 4.

Furthermore, the dynamic frequency adjustment unit 104 first judges the display mode of the image information, and subsequently performs a data reconciliation of the image information to be displayed. The examples of the data reconciliation are illustrated as follows.

We assume that the original data has a frame rate of 60 Hz, i.e. 60 frames per second, then the original data has 600 frames per ten seconds, and the resolution is (Nx, Ny). Thus the data function may be represented as Data(f, x, y, data(R, G,B)), f=1-600, x=1–Nx, y=1–Ny, wherein the data(R,G,B) is a RGB tristimulus value or a signal value (or represented as data(Y, x, y) or data(Y, u, v)).

Taking the frame rate of 10 Hz for comparison, every 6 frames are averaged to obtain an average value Data10(6,x, y,data) to compare the function change and judge the mode thereof. That is, Data6(x, y, data)=(1/6)ΣData(f, x, y, data), f=1~6, which represents that the sum of every 6 frame data is averaged.

Taking the frame rate of 5 Hz for comparison, every 12 frames are averaged to obtain an average value Data12(x, y, data) for comparison. Taking the frame rate of 1 Hz for comparison, every 60 frames are averaged to obtain an average value Data60(x, y, data) for comparison. Taking the frame rate of 0.5 Hz for comparison, every 120 frames are averaged to obtain an average value Data120(x, y, data) for comparison.

Furthermore, in another embodiment, additionally within 10 seconds or other certain length of time, a mean square root (ΔData6, ΔData12, ΔData60 and ΔData600) of the above-mentioned Data6, Data12, Data60 and Data600 is obtained for comparison. For example, ΔData6(x, y, data)={1/N Σ[Data6(x, y, data)−Data(f, x, y, data)]^2}^ 0.5. The mode is judged by the operations above, and this statistical method facilitates improving the stability of judgment.

Furthermore, if the amount of data for computation is too large, the number of samples and gray scale may be reduced (for example, only taking the high level portion) for judgment.

Figure 2:
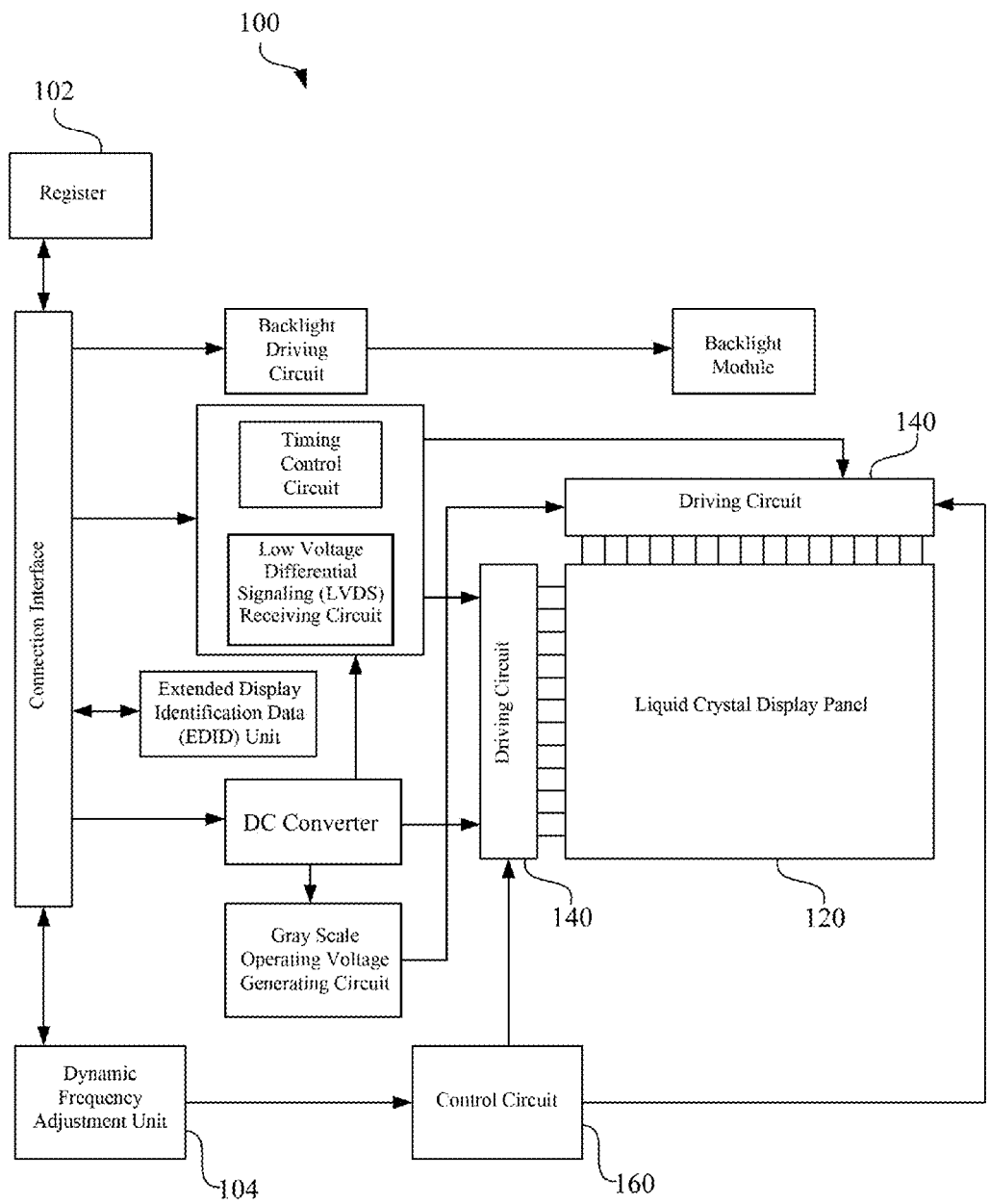
FIG. 2 illustrates a schematic circuit diagram of a liquid crystal display apparatus.

Referring to FIG. 2, FIG. 2 illustrates a schematic circuit diagram of the liquid crystal display apparatus 100, but the hardware elements included in the liquid crystal display apparatus 100 is not limited to FIG. 1. As shown in FIG. 2, the liquid crystal display apparatus 100 also includes other electronic elements required for displaying, such as a timing control circuit, a low voltage differential signaling (LVDS) receiving circuit, an extended display identification data (EDID) unit and the like.

Figure 3:
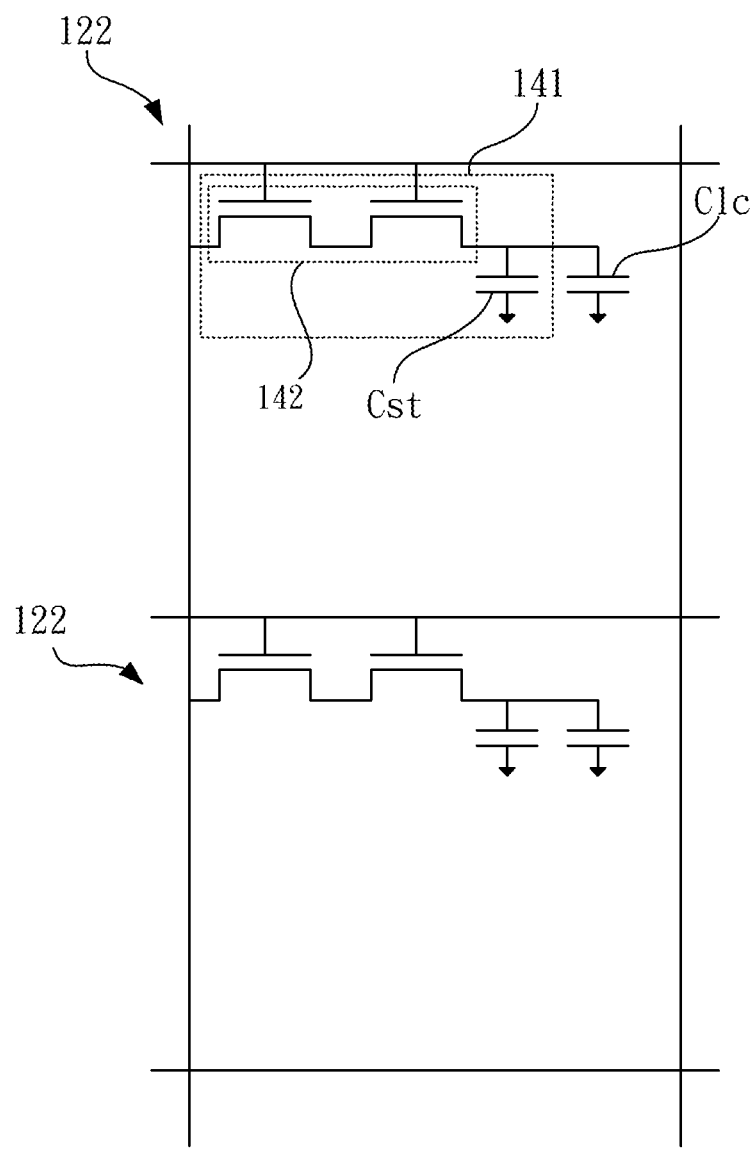
FIG. 3 illustrates a schematic top view of a pixel unit of the liquid crystal display apparatus.

Referring to FIG. 3, FIG. 3 illustrates a schematic top view of a pixel unit 122 of the liquid crystal display apparatus 100. It should be noted that the liquid crystal display panel 120 includes a plurality of pixel units 122 (such as 1024*768 pixel units 122), a plurality of pixel driving circuits 141, and each pixel unit includes a liquid crystal capacitor Clc. The pixel driving circuit 141 includes a plurality of storage capacitors Cst, and the storage capacitors Cst respectively correspond to the liquid crystal capacitors Clc. Each of the pixel driving circuits 141 is controlled by the driving circuit 140 (as shown in FIG. 1 and FIG. 2). In general, the voltage level of the liquid crystal capacitor Clc represents the content of the display signal. The storage capacitor Cst and the liquid crystal capacitor Clc are connected in parallel. The storage capacitor Cst is mainly used for maintaining the voltage level of the display signal. The refresh cycle of the above-mentioned capacitor increases when the display refresh rate decreases, which may cause decreasing of voltage retention rate, resulting in display distortion. However, in the invention, the capacitance of the storage capacitors Cst far exceeds that of the liquid crystal capacitors Clc, so as to improve the voltage retention rate of the display signal. In an embodiment, the capacitance of the storage capacitors Cst is larger than or equal to ten times of, or even fifty times of that of the liquid crystal capacitors Clc. Thus, the voltage retention rate of the display signal is improved.

Figure 4:
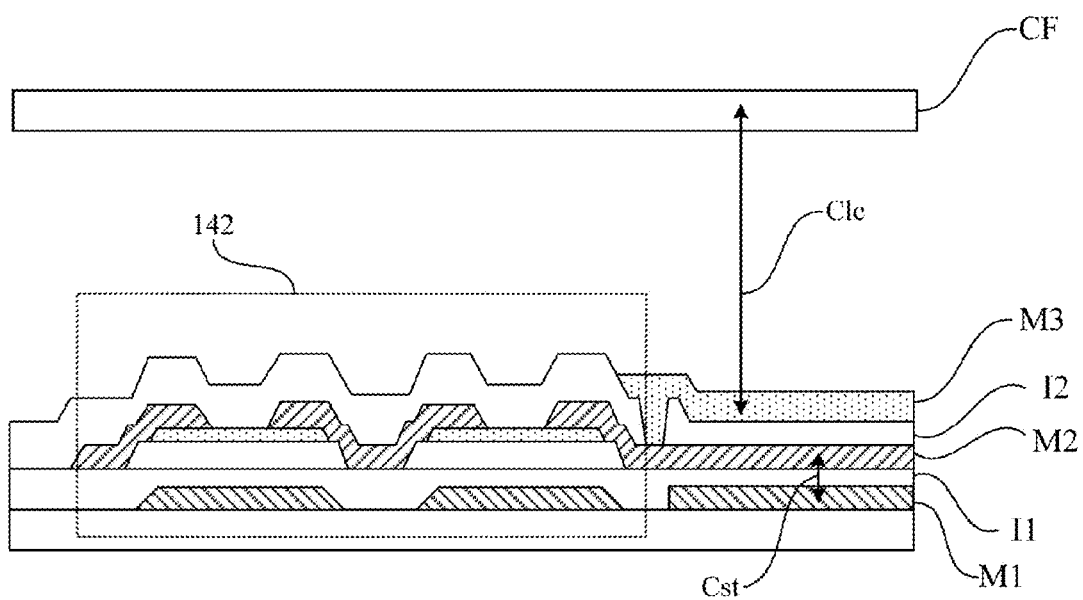
FIG. 4 illustrates a schematic sectional view of the liquid crystal display panel and the driving circuit of the liquid crystal display apparatus.

Referring to FIG. 4, FIG. 4 illustrates a schematic sectional view of the liquid crystal display panel 120 and the pixel driving circuit 141 of the liquid crystal display apparatus 100. FIG. 4 is a schematic view of a reflective TFT pixel, a transflective TFT pixel or a partially reflective TFT pixel, or a TFT pixel with high aperture rate (top ITO). Each pixel unit includes a gate layer and a first metal layer M1 (a common electrode layer), a second metal layer M2 (a drain layer and an extension layer of the drain layer), and a third metal layer or pixel electrode layer M3 (the pixel electrode layer is a reflective layer, or a partially transmissive and partially reflective layer, or a transparent electrode ITO layer) sequentially disposed on a lower substrate. Dielectric layer materials 11 and 12 may be respectively disposed between M1 and M2, and between M2 and M3. The liquid crystal capacitor Clc is formed between the common transparent electrode layer (such as the ITO and IZO transparent electrodes) of the upper substrate (i.e., the filter substrate CF in FIG. 4) and the pixel electrode layer M3. On the lower substrate, the storage capacitor Cst is disposed between the common electrode layer M1 and the extension layer M2 of the drain layer, and between the common electrode layer M1 and the pixel electrode layer M3. In a practical application, the upper substrate may be a color filter substrate.

Furthermore, in the transmissive liquid crystal display panel, the transflective liquid crystal display panel, or the partially reflective liquid crystal display panel, each layer of M1, M2 and M3 may partially adopts (especially for the display area) a transparent ITO or IZO electrode layer to increase the aperture rate, and the materials are not limited to nontransparent metal materials.

Figure 5:
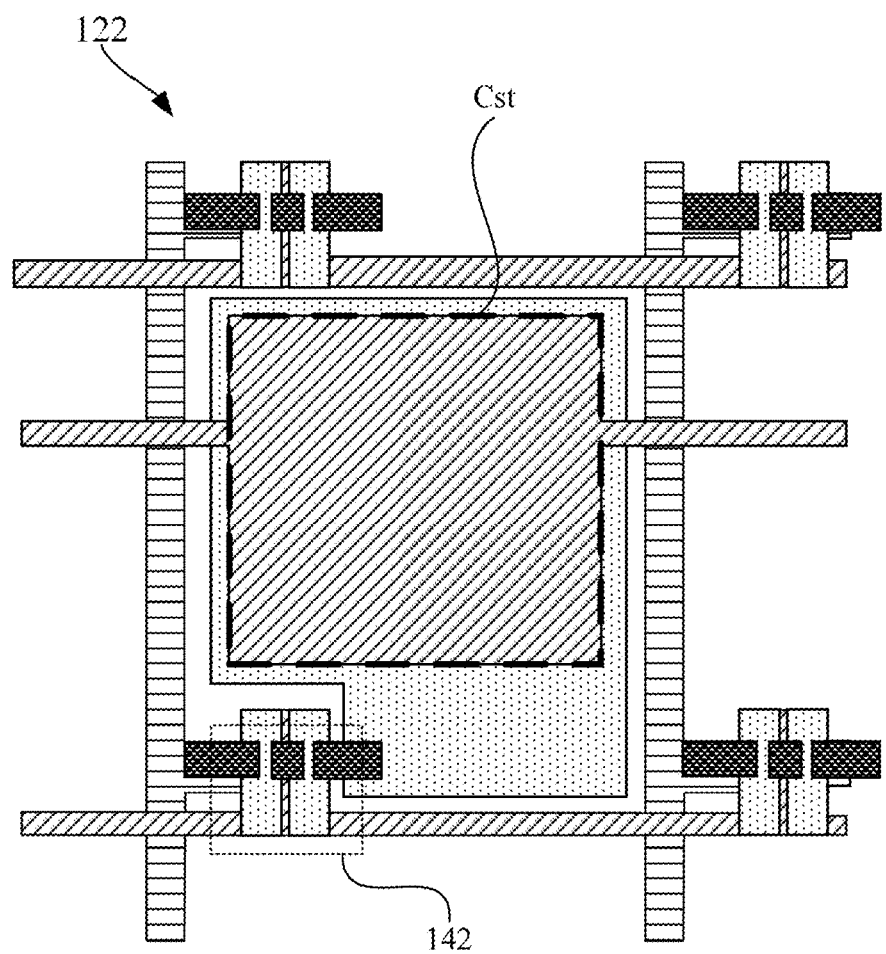
FIG. 5 illustrates a schematic view of a storage capacitor of a pixel unit.

The distance between the conducting materials (the common electrode layer M1 and the extension layer M2 of the drain layer of the lower substrate) which form the storage capacitor Cst may be designed far smaller than that of the conducting materials (the common electrode layer of the upper substrate and the pixel electrode layer M3) which form the liquid crystal capacitor Clc, so that the smaller distance between the conducting materials which form the storage capacitor Cst is used for improving the capacitance of the storage capacitor Cst. Furthermore, referring to FIG. 5, the planar extension area of the storage capacitor Cst may also be used for improving the capacitance of the storage capacitor Cst. FIG. 5 illustrates a schematic view of the storage capacitor Cst of the pixel unit 122. In an embodiment, the area ratio of the storage capacitor Cst to the pixel unit 122 is larger than or equal to 85% (as shown in FIG. 5). In this regard, the capacitance of the storage capacitors Cst is larger than or equal to ten times of, or even fifty times of that of the liquid crystal capacitors Clc. Thus, the voltage retention rate of the display signal is improved.

In an embodiment, the average capacitance of the liquid crystal capacitors Clc is larger than or equal to 0.5 picofarad. A liquid crystal impedance of the liquid crystal display panel is larger than or equal to $10^{13}$ ohm/cm, and an alignment-film impedance of the liquid crystal display panel is larger than or equal to ten times of the liquid crystal impedance. In another embodiment, an alignment-film impedance of the liquid crystal display panel is further larger than or equal to fifty times of the liquid crystal impedance.

Moreover, in this embodiment, the pixel driving circuit 141 of the invention may further adopts the dual-gate architecture 142 (referring to FIGS. 3 and 4).

The dual-gate architecture 142 can reduce the leakage current of the pixel driving circuit 141, which facilitates improving the voltage retention rate of the display signal. In an embodiment, an off-state leakage current of the pixel driving circuit 141 may be less than or equal to 10-13 ampere. In another embodiment, the off-state leakage current of the pixel driving circuit 141 may be further less than or equal to 10-14 ampere.

Figure 6:
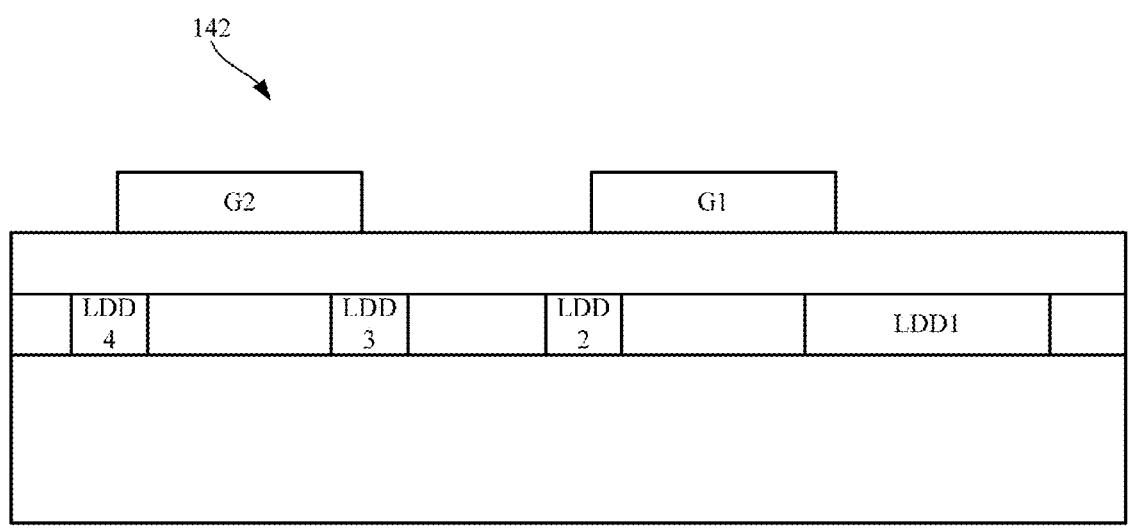
FIG. 6 illustrates a schematic view of a dual-gate architecture.

The detailed implementations of the dual-gate architecture 142 are shown in FIG. 6, which illustrates a schematic view of the dual-gate architecture 142. As shown in FIG. 6, the dual-gate architecture 142 of the pixel driving circuit 141 includes a lightly doped drain (LDD) TFT. The lightly doped drain (LDD) TFT at least includes a first lightly doped drain LDD1 and a second lightly doped drain LDD2 with different lengths, and the first lightly doped drain LDD1 nearest to the driving transistor has the largest length. The lightly doped drain (LDD) TFT is a dual-gate TFT, at least including a first gate G1 and a second gate G2. The dual-gate thin film transistor (TFT) further includes a third lightly doped drain LDD3 and a fourth lightly doped drain LDD4. The first gate G1 corresponds to the first lightly doped drain LDD1 and the second lightly doped drain LDD2, and the second gate G2 corresponds to the third lightly doped drain LDD3 and the fourth lightly doped drain LDD4. The first lightly doped drain LDD1 is nearest to the driving transistor and the first lightly doped drain LDD1 has a length larger than that of the other three lightly doped drains (LDD2-LDD4).

Figure 7:
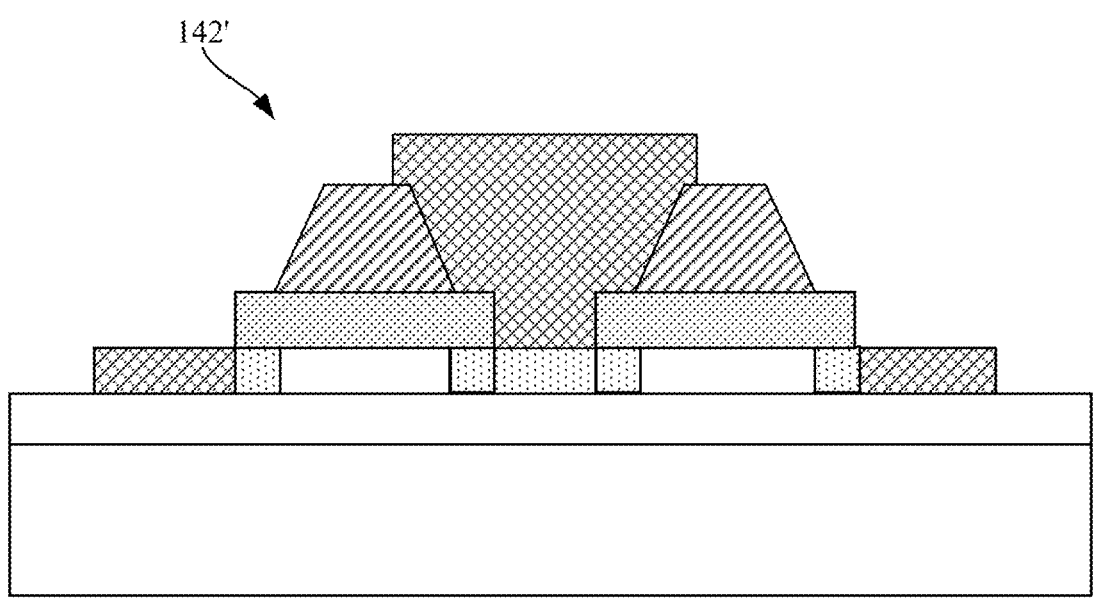
FIG. 7 illustrates a schematic view of another dual-gate architecture.

Referring to FIG. 7, FIG. 7 illustrates a schematic view of another dual-gate architecture 142'. As shown in FIG. 7, the dual-gate architecture 142' includes a substrate, an active layer, a first gate insulating layer, a second gate insulating layer, a first gate layer and a second gate layer. The active layer is formed on the substrate. The first gate insulating layer is formed on the active layer and covers a first channel area, the fourth lightly doped area and the second lightly doped area. The second gate insulating layer is formed on the active layer and covers a second channel area, the third lightly doped area and the fifth lightly doped area. The first gate layer is formed on the first gate insulating layer and covers the first gate insulating layer above the first channel area. The second gate layer is formed on the second gate insulating layer and covers the gate insulating layer above the second channel area. The detailed descriptions and method for forming various dual-gate architectures are well known to those skilled in the art, and are not described herein.

As described above, the pixel driving circuit 141 of the invention may further adopts various dual-gate architectures or multi-gate architectures, which reduce the leakage current of the pixel driving circuit 141, thereby improving the voltage retention rate of the display signal. As such, even when the display refresh rate of the liquid crystal display apparatus 100 decreases, a good display effect may be still maintained.

In an embodiment, the driving circuit 140 of the liquid crystal display apparatus 100 further includes a row inversion method and a frame inversion method.

In the paragraphs mentioned above, the invention discloses a liquid crystal display apparatus 100 having the dynamic adjustable refresh rate. The liquid crystal display apparatus 100 can accordingly adjust the display refresh rate of the driving circuit based on an image characteristic classification (such as a dynamic state, a static state, images, texts, fast changing and slow changing) of the currently displayed image information, thereby achieving the power saving effect by adopting a dynamic switchable and low display refresh rate. Furthermore, the invention further provides a driving circuit having the dual-gate architecture for improving the capacitance of the storage capacitor Cst and improving the voltage retention rate of the display signal at a low display refresh rate.

Figure 8:
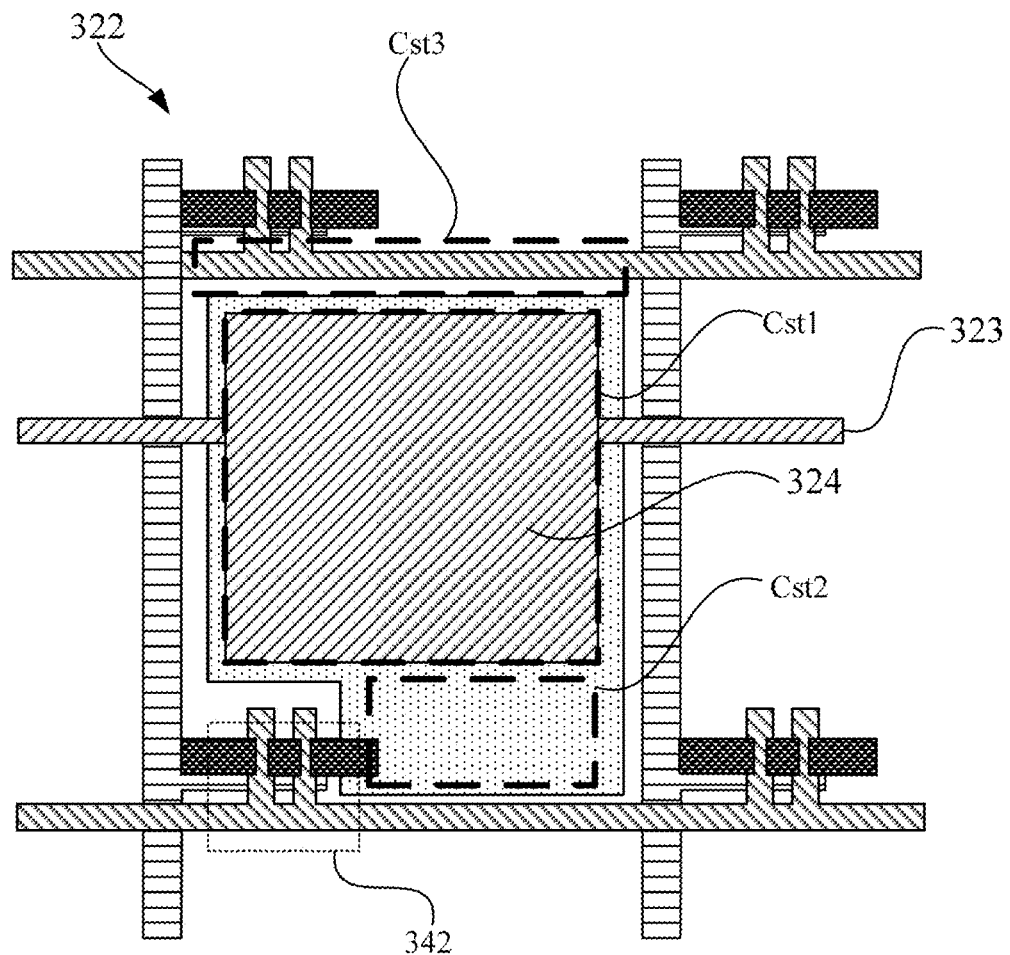
FIG. 8 illustrates a schematic top view of a pixel unit of a liquid crystal display apparatus according to a second specific embodiment of the invention.

Referring to FIG. 8, FIG. 8 illustrates a schematic top view of a pixel unit 322 of a liquid crystal display apparatus according to a second specific embodiment of the invention. The design of the pixel unit of the second specific embodiment has characteristics of low leakage current and a high voltage retention rate. The design of the pixel unit of the second specific embodiment may be used to support the liquid crystal display apparatus 100 of the first specific embodiment having the dynamic adjustable rate, and maintain a stable display effect even at a low display rate.

The liquid crystal display apparatus of the second specific embodiment includes a liquid crystal display panel. The liquid crystal display panel at least includes a plurality of liquid crystal capacitors, a plurality of pixel units 322 (as shown in FIG. 8), an upper alignment film layer and a lower alignment film layer. The liquid crystal impedance is larger than or equal to $10^{13}$ ohm/cm, and the alignment-film impedance of the liquid crystal display panel is larger than or equal to ten times of the liquid crystal impedance.

The driving circuit at least includes a display refresh rate and a plurality of storage capacitors. The storage capacitors respectively correspond to the liquid crystal capacitors. The capacitance of the storage capacitors is larger than or equal to ten times of that of the liquid crystal capacitors. The driving circuit casts the image information on the liquid crystal display panel. The driving circuit comprises two or more TFT switches, a dual-gate TFT or a LDD TFT corresponding to each pixel element, and an off-state leakage current of the driving circuit is less than or equal to $10^{-12}$ ampere. Other detailed descriptions of the liquid crystal display apparatus may be referred to the illustrations of the first specific embodiment.

Figure 9:
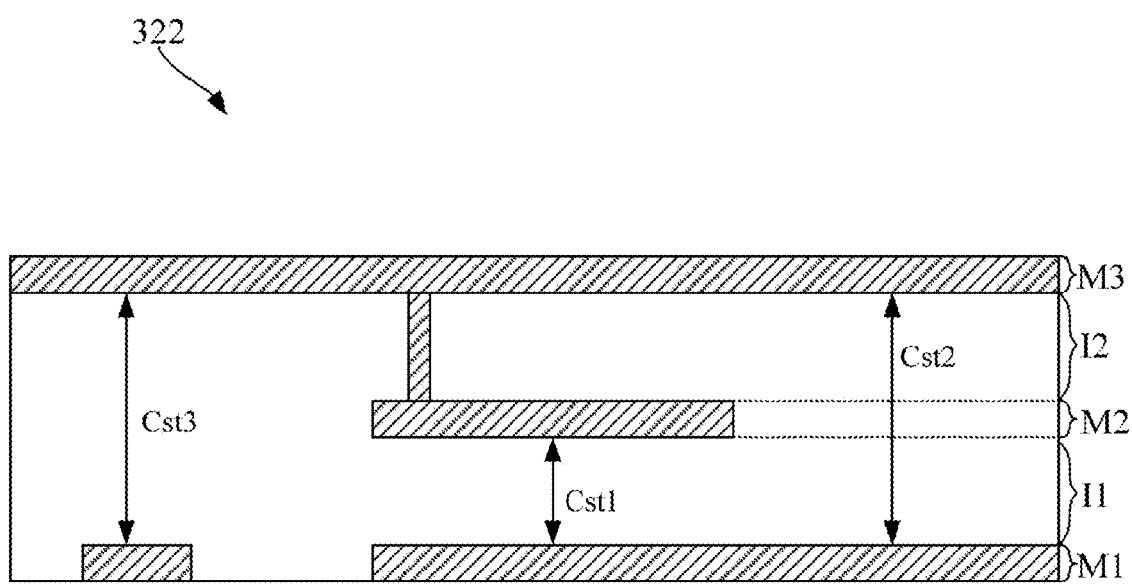
FIG. 9 illustrates a schematic sectional view of the pixel unit according to the second specific embodiment of the invention.

Referring to FIG. 9, FIG. 9 illustrates a schematic sectional view of the pixel unit 322 according to the second specific embodiment of the invention. It should be noted that, as shown in FIGS. 8 and 9, the pixel unit 322 includes a first electrode layer M1, a second electrode layer M2 and a third electrode layer M3 disposed on the lower substrate. A dielectric layer material 11 is disposed between the first electrode layer M1 and the second electrode layer M2, and a dielectric layer material 12 is disposed between the second electrode layer M2 and the third electrode layer M3.

As shown in FIGS. 8 and 9, the second electrode layer M2 includes an extension layer of a drain layer. The third electrode layer M3 includes a pixel electrode layer. A dielectric layer material is respectively disposed between the first electrode layer and the second electrode layer, and between the second electrode layer and the third electrode layer. The first electrode layer M1 includes a gate layer 342 and/or a common electrode conductive layer 324 (as shown in FIG. 8). The extension layer of the drain layer is connected with the pixel electrode layer, and/or the common electrode conductive layer 324 is electrically connected with a common transparent electrode layer of the upper substrate. The liquid crystal capacitor is formed between the common transparent electrode layer of the upper substrate and the pixel electrode layer of the lower substrate. The storage capacitor may have three parts. The first part, storage capacitor Cst1, is disposed between the common electrode conductive layer 324 of the first electrode layer M1 and the extension layer of the second electrode layer. The second part, storage capacitor Cst2, is disposed between the common electrode conductive layer of the first electrode layer M1 and the pixel electrode layer of the third electrode layer M3. The third part, storage capacitor Cst3, is disposed between the gate layer of the first electrode layer M1 and the pixel electrode layer of the third electrode layer M3.

Figure 14:
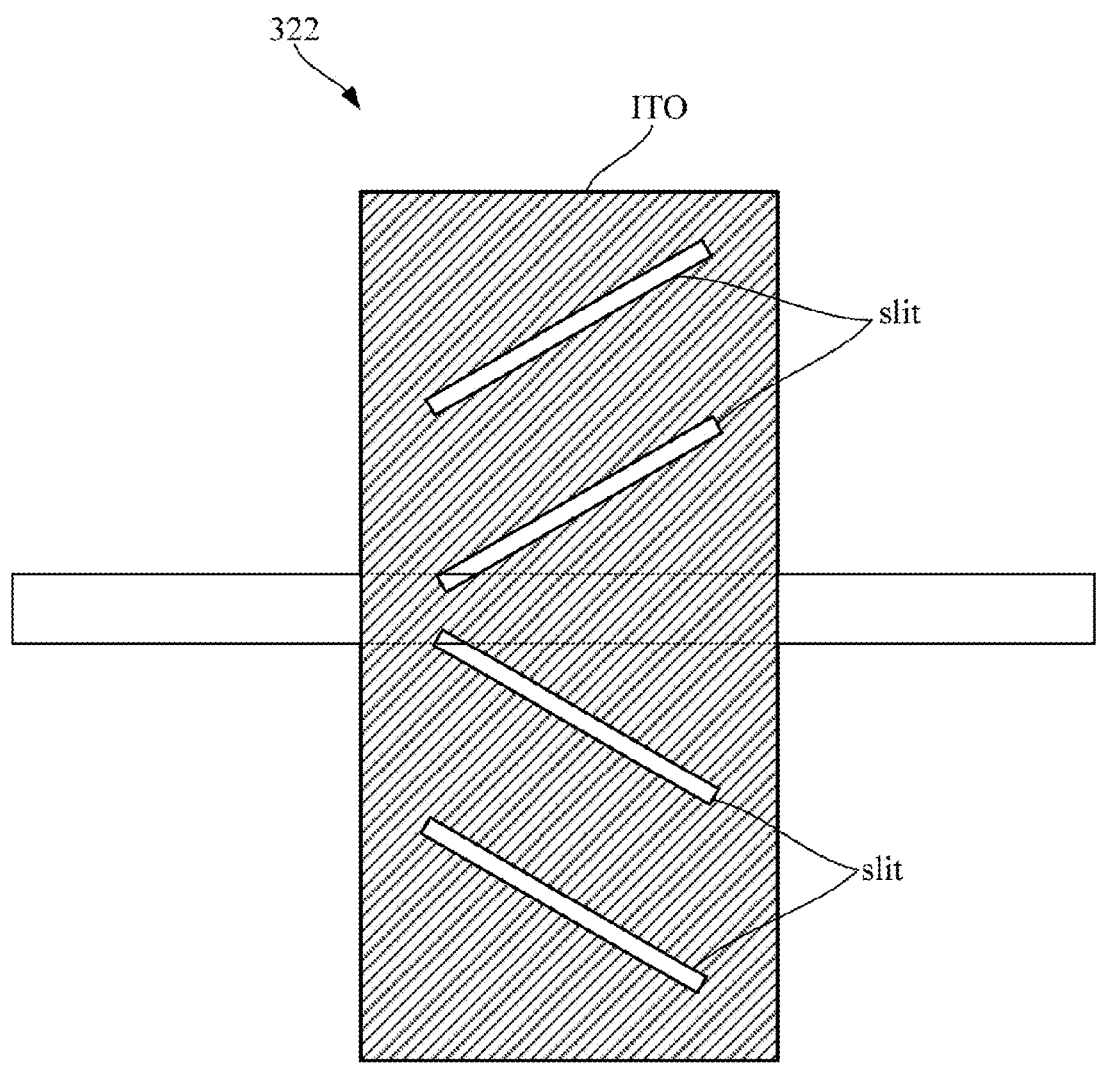
FIG. 14 illustrates a schematic view of a pixel electrode layer having ITO slits.

In the design of the pixel unit 322 mentioned above, the pixel electrode layer is a transparent electrode, a metal reflective electrode or a combination thereof. The liquid crystal display panel may be a transmissive liquid crystal display panel, a reflective liquid crystal display panel, a transflective liquid crystal display panel or a partially reflective liquid crystal display panel. The dielectric layer material of the storage capacitor is a silica material SiOx, a nitrogen oxide material SiNx, a resin material, a plastic material or a photoresist material. The dielectric layer material of the storage capacitor has a thickness less than or equal to 0.2 μm. In the pixel unit 322 of the above-mentioned embodiment, the pixel electrode layer is of a pixel electrode layer architecture including Indium Tin Oxide (ITO) slits. Referring to FIG. 14, FIG. 14 illustrates a schematic view of a pixel electrode layer including ITO slits. As shown in FIG. 14, several slits are disposed on the common electrode layer ITO of the pixel unit 322. The liquid crystal layer is constructed by negative liquid crystals aligned vertically.

Furthermore, in another embodiment, another pixel unit design of the invention is as follows. Each pixel unit at least corresponds to one of the liquid crystal capacitors and one of the storage capacitors. Each pixel unit includes the gate layer of the first electrode layer M1, the second electrode layer M2 and the common electrode layer of the third electrode layer M3 sequentially disposed on the lower substrate. Dielectric layer materials (11, 12) are respectively disposed between the first electrode layer M1 and the second electrode layer M2, and between the second electrode layer M2 and the third electrode layer M3, as shown in FIGS. 8 and 9.

It should be pointed out that the second electrode layer M2 includes a source layer, a drain layer and a pixel electrode layer connected with the drain layer. The pixel electrode layer of the second electrode layer M2 and the common electrode layer of the third electrode layer M3 are formed in a comb-shaped electrode architecture, a grid-shaped electrode architecture, a curving comb-shaped electrode architecture or a curving grid-shaped electrode architecture. No common electrode layer is disposed on the upper substrate. A color filter and a flat layer may be disposed on the upper substrate. The liquid crystal capacitor is formed in the curving electric field between the pixel electrode layer of the second electrode layer and the common electrode layer of the third electrode layer. The storage capacitor is disposed between the pixel electrode layer of the second electrode layer and the common electrode layer of the third electrode layer.

Figure 10:
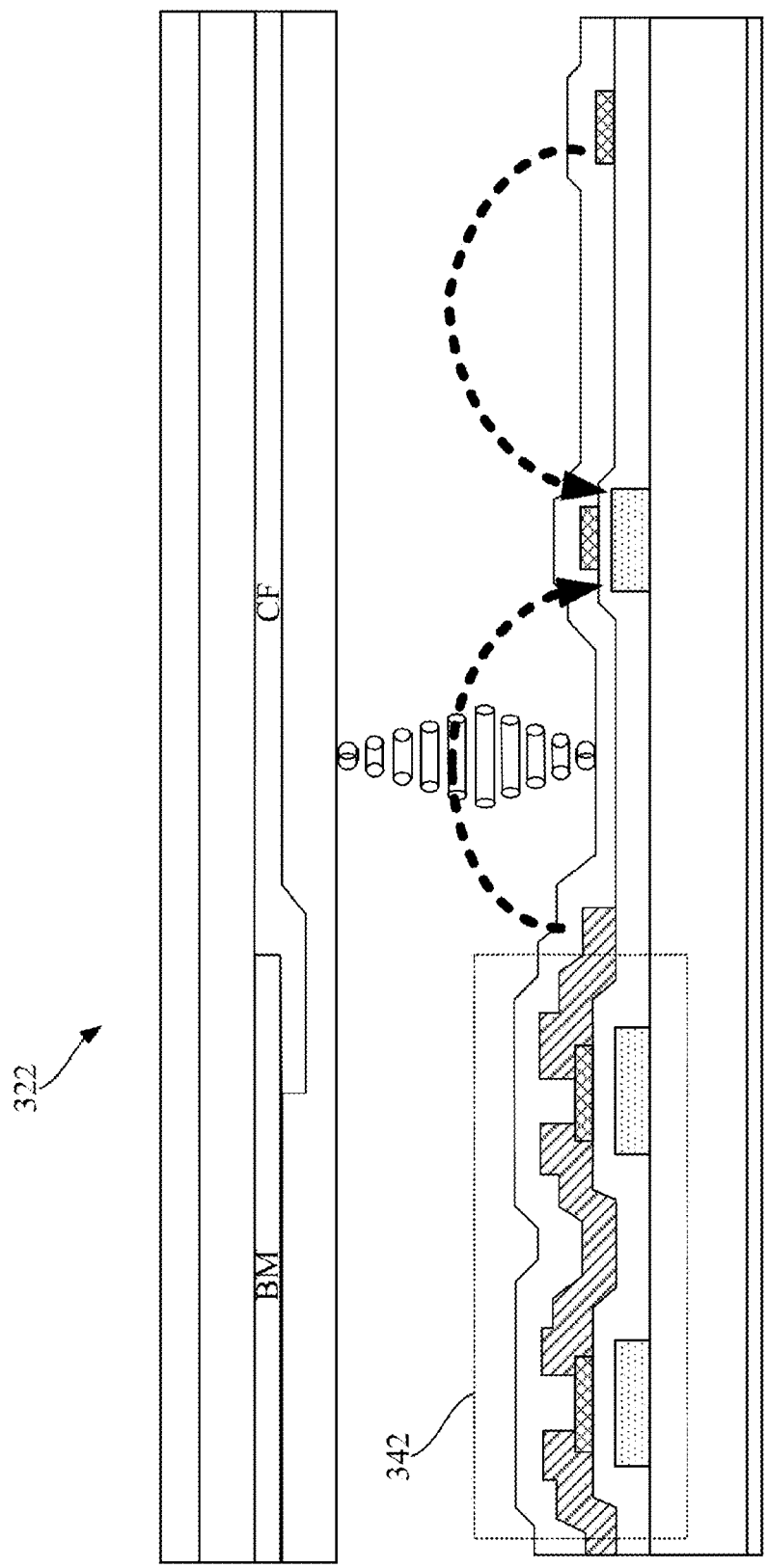
FIG. 10 illustrates a schematic view of a pixel unit of an in plane switching architecture.
Figure 11:
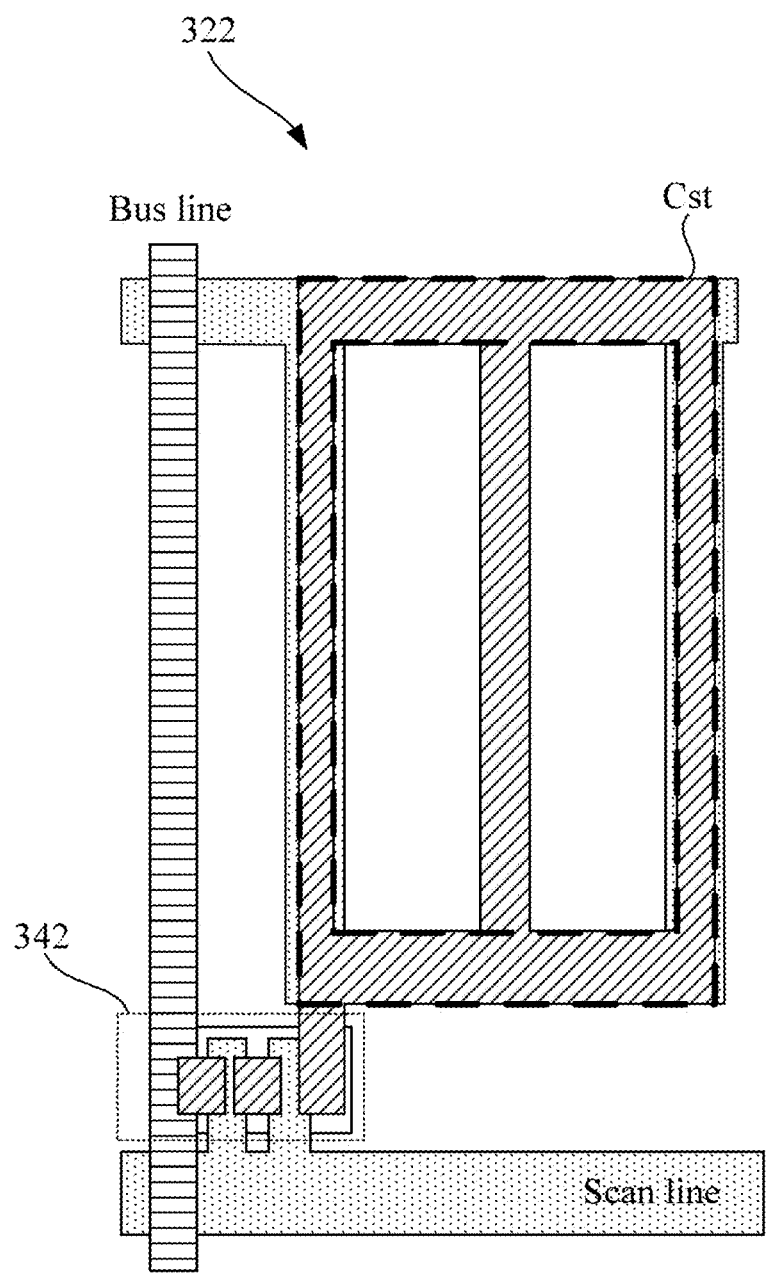
FIG. 11 illustrates a schematic view of a pixel unit of an in plane switching architecture.

Referring to FIGS. 10 and 11, in an embodiment, the pixel electrode layer in FIGS. 10 and 11 is of an in plane switching architecture. The liquid crystal molecular layer can be formed by liquid crystals (positive or negative liquid crystals) aligned horizontally. The pixel electrode layer and the common electrode layer are metal or alloy conductive electrodes. The pixel electrode layer and the common electrode layer of the lower substrate of the liquid crystal display apparatus are comb-shaped or grid-shaped electrodes, or curving comb-shaped or grid-shaped electrodes.

In another embodiment, the liquid crystal display apparatus of the in plane switching architecture at least includes a pixel electrode layer and a common electrode layer. The pixel electrode layer and the common electrode layer may are of a comb-shaped or grid-shaped electrode architecture, or a curving comb-shaped or grid-shaped electrode architecture. The common electrode layer is a first metal electrode M1, and the pixel electrode layer is a second metal electrode M2. The storage capacitor formed by the M1 and M2 may be located at the position of the comb-shaped or grid-shaped electrodes, and even a circle (or square-shaped) storage capacitor is formed.

Figure 12:
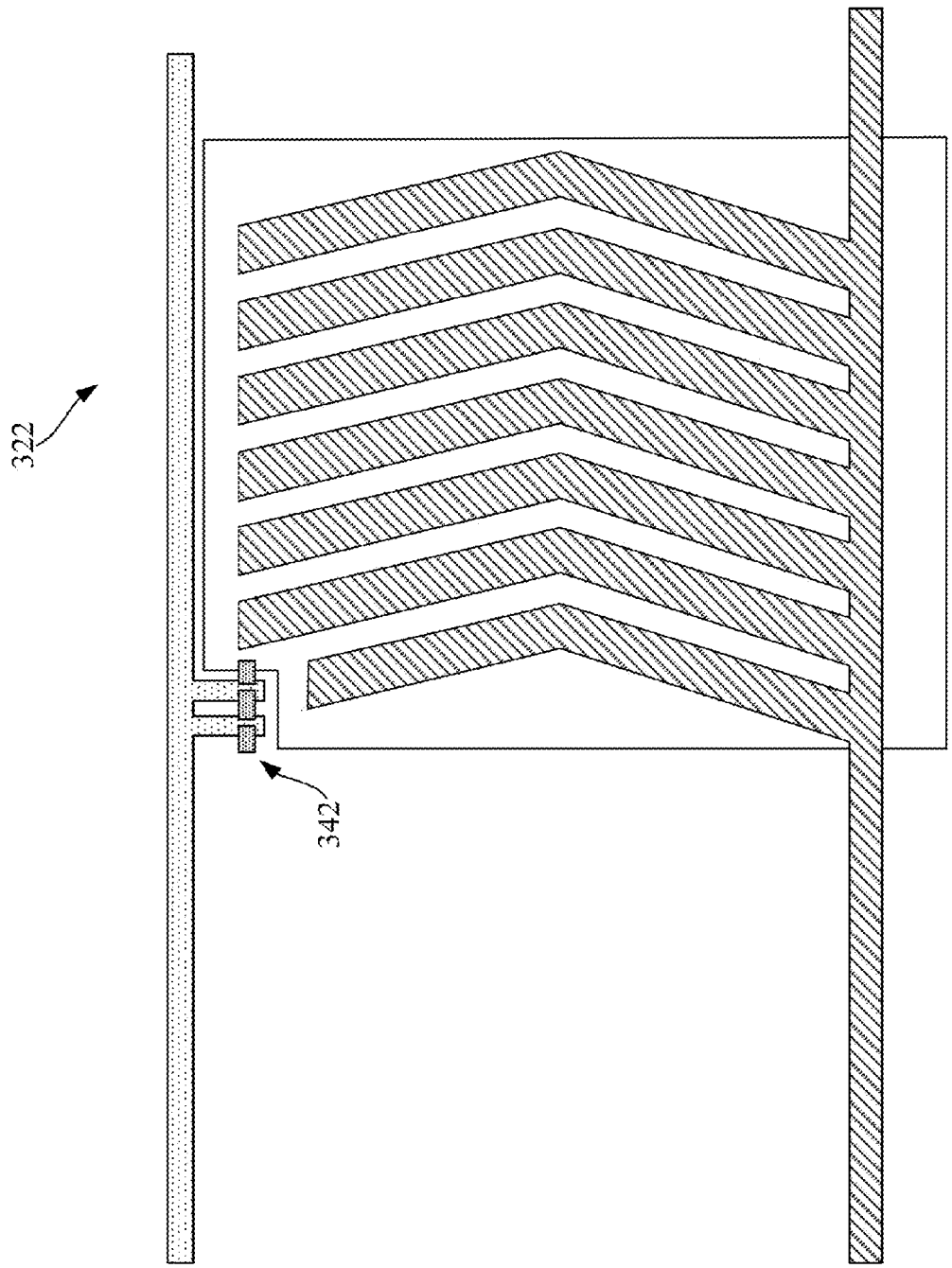
FIG. 12 illustrates a schematic view of a pixel unit of an fringe field switching architecture.
Figure 13:
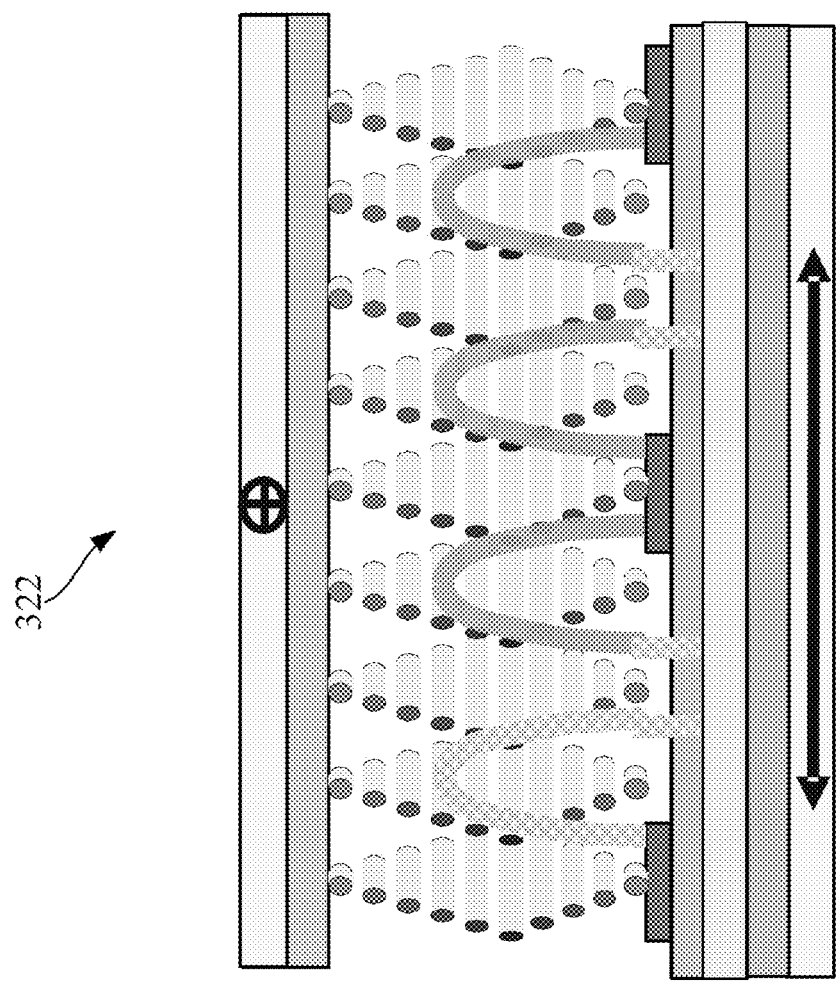
FIG. 13 illustrates a schematic view of a pixel unit of an fringe field switching architecture.

In yet another embodiment, referring to FIGS. 12 and 13, the pixel electrode layer may also be of the fringe field switching architecture. The liquid crystal molecular layer may be constructed by negative liquid crystals aligned horizontally. The pixel electrode layer and the common electrode layer are ITO or IZO transparent electrodes, or metal or alloy conductive electrodes. In this embodiment, the pixel electrode layer may be a rectangle or unit-pixel electrode layer. The common electrode layer may be a comb-shaped or grid-shaped electrode, or a curving comb-shaped or grid-shaped electrode (as shown in FIG. 12).

In the design of the pixel unit mentioned above, the pixel electrode layer may also be a transparent electrode, a metal reflective electrode or a combination thereof. The liquid crystal display panel may be a transmissive liquid crystal display panel, a reflective liquid crystal display panel, a transflective liquid crystal display panel or a partially reflective liquid crystal display panel. The dielectric layer material of the storage capacitor is a silica material SiOx, a nitrogen oxide material SiNx, a resin material, a plastic material or a photoresist material. The dielectric layer material of the storage capacitor has a thickness less than or equal to 0.2 μm. In view of the above, the pixel design and the liquid crystal material of various pixel units disclosed in the second specific embodiment may be used for supporting to dynamically adjust the liquid crystal display apparatus to a low display refresh rate, thereby reducing the energy cost of the liquid crystal display apparatus. Thus, by using the method of the invention, a liquid crystal display apparatus with high energy efficiency and a stable display effect (abnormal display conditions such as screen scintillation may be avoided) is provided.

Furthermore, the invention may be further applied in a liquid crystal display apparatus having brightness or luminance holding ratio compensation. The transmittance of the liquid crystal display panel increases with time in a display frame cycle. The backlight module can form a plurality of backlight shield-blocking periods in a display frame cycle, or gradually adjust the backlight driving current.

Although the invention has been disclosed with reference to the above embodiments, these embodiments are not intended to limit the invention. It will be apparent to those of skills in the art that various modifications and variations can be made without departing from the spirit or scope of the invention. Therefore, the scope of the invention shall be defined by the appended claims.

What is claimed is:

1. A liquid crystal display apparatus, comprising:
a register for temporarily storing image information;
a liquid crystal display panel comprising a plurality of liquid crystal capacitors, a plurality of pixel units, an upper alignment film layer and a lower alignment film layer;
a driving circuit comprising a plurality of storage capacitors corresponding to the liquid crystal capacitors, wherein a capacitance of the storage capacitors far exceeds a capacitance of the liquid crystal capacitors, and the driving circuit casts the image information on the liquid crystal display panel;
a dynamic frequency adjustment unit for computing and judging based on an image characteristic classification of the image information stored in the register and dynamically generating a display mode control signal; and
a control circuit electrically connected with the dynamic frequency adjustment unit and the driving circuit, wherein the control circuit adjusts a display refresh rate and a display configuration of the driving circuit according to the display mode control signal,
wherein each of the plurality of pixel units of the liquid crystal display panel at least corresponds to one of the liquid crystal capacitors and one of the storage capacitors, each pixel unit comprises a first electrode layer, a second electrode layer and a third electrode layer sequentially disposed on a lower substrate, the second electrode layer comprises an extension layer of a drain layer, the third electrode layer comprises a pixel electrode layer, dielectric layer materials are respectively disposed between the first electrode layer and the second electrode layer, and between the second electrode layer and the third electrode layer, the first electrode layer comprises a gate layer and/or a common electrode conductive layer, and the extension layer of the drain layer is connected with the pixel electrode layer, and/or the common electrode conductive layer is electrically connected with a common transparent electrode layer of a upper substrate, wherein the liquid crystal capacitor is formed between the common transparent electrode layer and the pixel electrode layer of the lower substrate, and the storage capacitor is disposed between the common electrode conductive layer of the first electrode layer and the extension layer of the second electrode layer, and/or between the common electrode conductive layer of the first electrode layer and the pixel electrode layer, and/or between the gate layer of the first electrode layer and the pixel electrode layer.

2. The liquid crystal display apparatus of claim 1, wherein the image characteristic classification comprises a dynamic image, a static slow image or a static holding image, the display configuration comprises a gray level depth.

3. The liquid crystal display apparatus of claim 2, wherein the image information further has an image characteristic sub-classification, which comprises a full color mode, an image mode, a text mode, a monochromatic image mode and/or a low gray levels mode, and the dynamic frequency adjustment unit generates a corresponding display mode control signal based on the image characteristic classification and the image characteristic sub-classification of the image information.

4. The liquid crystal display apparatus of claim 1, wherein the dynamic frequency adjustment unit at least has two or more sets of display frame rates.

5. The liquid crystal display apparatus of claim 1, wherein the driving circuit comprises two or more thin film transistor (TFT) switches, a dual-gate thin film transistor or a lightly doped drain (LDD) thin film transistor corresponding to each pixel unit, and an off-state leakage current of the driving circuit is less than or equal to $10^{-12}$ ampere, the LDD TFT of the driving circuit at least has a first lightly doped drain and a second lightly doped drain with different lengths, and the first lightly doped drain nearest to the driving transistor has the largest length.

* * * * *